Figure 1:
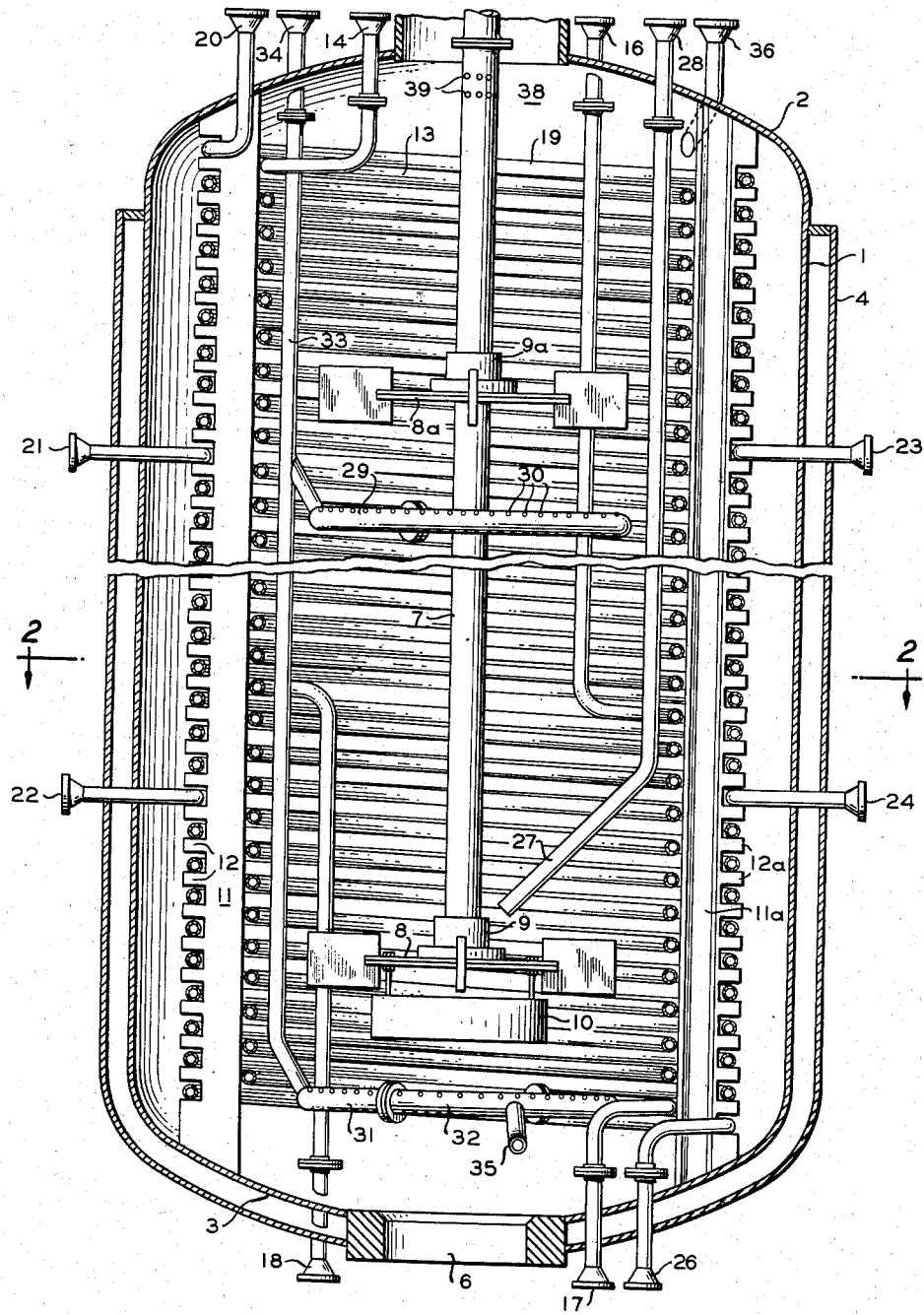

Feb. 24, 1959

R. F. DYE 2,875,027

STIRRED REACTOR

Filed April 26, 1956

2 Sheets-Sheet 1

INVENTOR.
R. F. DYE
BY Hudson & Young
ATTORNEYS

Feb. 24, 1959  R. F. DYE  2,875,027
STIRRED REACTOR
Filed April 26, 1956  2 Sheets-Sheet 2

INVENTOR.
R. F. DYE
BY *Hudson & Gring*
ATTORNEYS

United States Patent Office 2,875,027
Patented Feb. 24, 1959

2,875,027
STIRRED REACTOR

Robert F. Dye, Bartlesville, Okla., assignor to Phillips Petroleum Company, a corporation of Delaware Application April 26, 1956, Serial No. 580,770

3 Claims. (Cl. 23—285)

This invention relates to an apparatus for mixing chemical reactants. In one of its more specific aspects it relates to an apparatus for mixing chemically reactive fluids which are highly viscous while maintaining temperature and concentration gradients within the fluid at a minimum. In another of its more specific aspects, this invention relates to an apparatus suitable for carrying out a liquid phase polymerization reaction in such a manner that polymer deposits within the reactor are minimized. In still another aspect, this invention relates to an apparatus for mixing chemical reactants in a liquid phase while incorporating therein gases from an upper gaseous phase.

In many polymerization reactions, such as the liquid phase polymerization of ethylene to form high molecular weight polymers, the control of temperature and concentration of reactants is of utmost importance. The molecular weight and physical characteristics of the final product of such reactants are dependent to a considerable extent upon the operating conditions of temperature, pressure, concentration and reaction time. If these conditions are not maintained uniform throughout the reaction vessel, the resulting product will likewise lack uniformity in physical characteristics.

The problems of control of such polymerization reactions are increased by several features inherent in the reaction itself. One of these is the highly exothermic nature of the reaction which necessitates a considerable amount of heat removal and highly efficient agitation to insure that temperature gradients throughout the reactor are at a minimum. The importance of efficient agitation is accentuated by the necessity for uniform reactant concentrations throughout the fluid mass and immediate dispersal of reactants as they are introduced into the vessel. This is complicated by the highly viscous nature of the fluid mass of polymer and solvent. Solutions to this problem which involve reducing polymer concentration in order to lower the viscosity of the reacting fluids are unsatisfactory because the over-all efficiency of the reactor is thereby decreased. The viscous nature of the fluid, likewise complicates temperature control by greatly decreasing the heat transfer coefficient across the liquid film on the cooling surfaces. Improper agitation throughout the vessel also causes deposits of solid polymer to build up on the cooling surfaces and further reduces efficiency of the temperature regulating means.

I have discovered a reactor design which utilizes features of agitation, heat transfer, reactant feed, and fluid circulation control in combination to enable a highly efficient and satisfactory control of a catalyzed polymerization process, successfully solving the problems hereinbefore described. The apparatus of my invention comprises an elongated reaction vessel having agitating means and reactant feed inlets near zones of maximum turbulence, baffle plates mounted within the vessel spaced inwardly from the vessel walls, and heat exchange conduits disposed about the agitating means.

In a preferred embodiment of this reactor, the heat exchange conduits are helical coils and the baffle plates extend substantially the full length of the reactor, the coils being supported upon the baffle plates. It is advantageous that a plurality of supporting fins extend from the outer edge of the baffle plates between the outer heat exchange coils. In such a reactor, a polymerization process can be carried out so that the temperature and concentration gradients are minimized and polymer deposits upon the equipment can be substantially eliminated. The reactor of my invention can be adapted for use either as a liquid-full reactor or as a gas-cap reactor in which a gaseous phase occupies a space above the reacting liquid mass. An improvement in my reactor of the latter type incorporates an agitator shaft through which reactive gases are drawn from the upper phase and dispersed into the lower liquid phase of reacting fluids, thus enabling higher reaction rates.

It is an object of my invention to provide an apparatus for mixing chemical reactants.

It is another object of my invention to provide an apparatus which is suitable for carrying out a catalyzed polymerization reaction in a viscous fluid mass with a minimum of temperature and concentration gradients throughout this mass.

It is still another object to provide an apparatus suitable as a gas-cap polymerization reactor having excellent mixing characteristics plus ability to circulate reactive gases from an upper gaseous phase into the liquid phase of the reacting materials.

Figure 2:
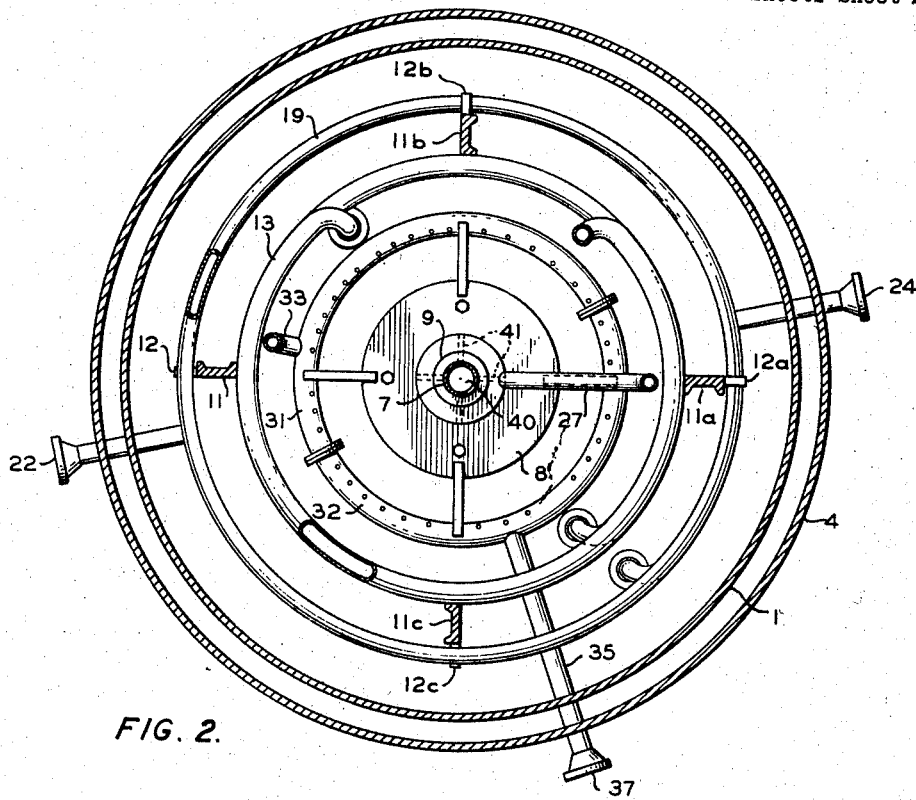
Figure 3:
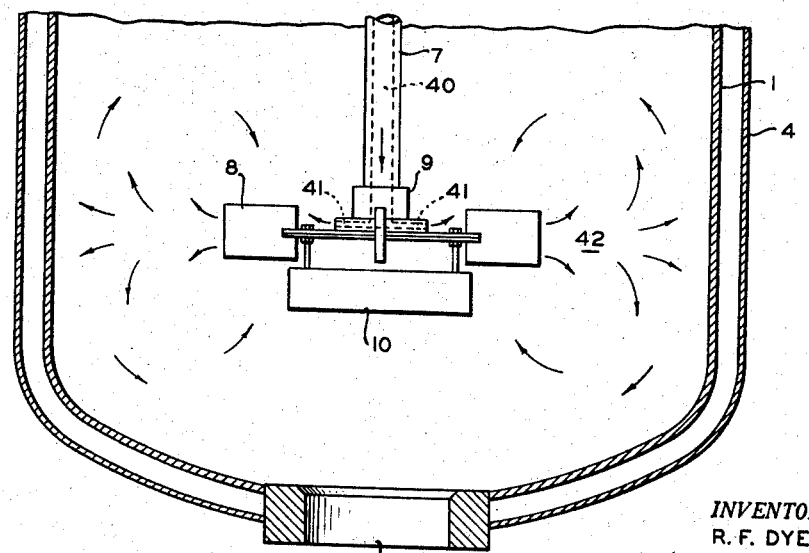

Various other objects, advantages and features of the invention will be apparent from the following detailed description taken in conjunction with the accompanying drawings in which:

Figure 1 is a vertical sectional view of a preferred embodiment of the reactor of this invention, Figure 2 is a horizontal sectional view of the reactor of Figure 1 taken along lines 2—2, and Figure 3 is a diagram of the circulation pattern within the liquid phase of the reactor showing the path by which gases enter the liquid phase and are dispersed therein.

While the apparatus of this invention is excellent for carrying out many liquid phase reactions where temperature and concentration control are of utmost importance, it is particularly valuable and has been developed especially for polymerization reactions in which the reaction fluids are quite viscous and temperature and concentration of reactants have a marked effect upon the physical properties of the reaction product. Examples of such reactions are the polymerization and copolymerization of polymerizable olefins, especially aliphatic and cyclic olefins, preferably 1-olefins including both mono- and diolefins, for example, butadiene, and the like. Among such reactions a preferred class of products are homopolymers of ethylene, propylene, 1-butene, 1-pentene, and the like, and copolymers of ethylene with propylene, 1-butene or butadiene, and the like. A reaction for which this invention is particularly useful is the polymerization of aliphatic 1-olefins with a maximum of 8 carbon atoms and no branching nearer the double bond than the 4-position in the presence of a catalyst comprising chromium oxide and at least one oxide from the group consisting of silica, alumina, zirconia, and thoria. Such a polymerization is preferably carried out in a hydrocarbon solvent which is liquid and inert under the contacting conditions such as naphthenic hydrocarbons and paraffinic hydrocarbons of from 3 to 12 carbon atoms, for example, isooctane and cyclohexane. The solvent is fed continuously to the reactor at such a rate as to maintain the desired residence time of reactants within the reaction vessel, usually about 3 or 4 hours. The 1-olefin is normally introduced to the reactor by separate means, and the catalyst, which is granular in form, can be introduced as a solids feed or in a slurry of solvent. In the reactor of my invention, these materials are introduced near zones of maximum turbulence and obtain immediate dispersal within the liquid phase by the mixing pattern produced by the agitation means and baffle arrangement. Throughout this specification the term "reactants" is used to refer not only to those materials which chemically react, for example monomer, but also to those materials which facilitate or promote the reaction, such as solvent and catalyst.

This polymerization is ordinarily carried out at a temperature in the range of 150° F. to 450° F. Since the reaction is highly exothermic, means for adequate heat removal is a necessity, and provision for efficient heat exchange is a part of this invention. Although the problem can be somewhat alleviated by using a cooled solvent feed, the heat exchange coils and jacket of the reactor of my invention provide the temperature control necessary for satisfactorily carrying out this polymerization reaction. It is important that the arrangement of the coils and the baffle plates be such that maximum mixing is obtained throughout the reactor and that quiet zones in the fluid mass, which tend to encourage deposition of polymer on the equipment, are substantially eliminated. Rapid fluid flow near the cooling surfaces within the reactor is also of utmost importance in order to obtain maximum heat transfer. In the reactor of my invention, the required polymerization temperature can be maintained within plus or minus 1° F. throughout the reactive mass.

Reaction products can be withdrawn from the reactor by outlet means in any suitable location so long as there is no channeling of materials from the inlet source. For a liquid full reactor, it is preferable to have the outlet near the top of the vessel. For the gas-cap modification, any suitable liquid level control system can be used.

A better understanding of my invention can be realized by reference to the accompanying drawings. Figure 1 is a vertical sectional view of a preferred embodiment of my invention showing the relative location of the various features. Reactor 1 is a cylindrically shaped vessel having ellipsoidal ends 2 and 3, and a jacket 4 through which cooling or heating medium may be circulated, and is equipped with a service manway 6. Agitation within the reactor is provided by an agitator having a shaft 7 axially disposed within the reactor and turbine impeller elements 8 and 8a mounted on collars 9 and 9a affixed to shaft 7. Whipping action of the shaft during high speed rotation is minimized by stabilizer ring 10.

To prevent swirling of the entire liquid mass and promote even agitation throughout the reactor, baffle plates 11 are located in radial alignment toward the outer wall of the reactor and spaced inwardly therefrom. These baffle plates are mounted within the reactor and extend from one end to the other. Although somewhat shorter baffles would be adequate, extending them into the ends of the reactor is preferred for ease of support. Along the outer edge of the baffle plates are a plurality of fins 12 which extend between the coils of the outer coil bank 19 providing support therefor and aiding in directing the flow of fluid past these heat exchange coils. The baffles can be of varying width, extending inside the inner coil bank, if necessary, to prevent swirling. These baffle plates thus designed and mounted provide, in cooperation with the central agitator, for maximum mixing throughout the reactor and a rapid flow of fluid along the outer reactor wall and past the heat exchange coils, thus contributing toward better heat transfer.

Additional cooling is provided by an inner bank of helical heat exchange coils 13, concentrically located about shaft 7, having coolant inlet means 14 and 16 and outlets 17 and 18. Cooling is likewise provided by an outer bank of helical heat exchange coils 19 also concentrically located about shaft 7 and supported by the fins 12 of baffle plates 11. The outer bank of coils 19 has inlet means 20, 21, and 22 and outlets 23, 24, and 26. The number of inlets and outlets for the various coil banks can be varied to meet the cooling requirements of the particular reaction. Although the number of banks of cooling coils can also be varied, it is preferred that the two banks be used as shown. If only one bank is used, the cooling capacity is reduced considerably and if more than two banks are used, the flow of fluids passing the coils is reduced so much that the efficiency of each coil bank is impaired and the additional cooling capacity gained generally does not justify the extra equipment. It is preferred that the coil banks be extended throughout the entire length of the vessel, for maximum and even cooling, although a somewhat shorter coil section is satisfactory. Any suitable temperature regulating medium can be circulated through the jacket and coils; for example, cyclohexane or iso-octane, which are possible polymerization solvents. The temperature of the regulating fluid must be sufficiently high that precipitation of polymer on the cooling surfaces within the reactor is avoided. This necessarily reduces the temperative differential available for efficient heat exchange.

Various feed inlets are shown and they may be used interchangeably for various feed materials depending upon the reaction. For the catalytic polymerization of olefins, it is preferred that conduit 27 connected to inlet 28 and discharging near the lower turbine impeller be used for feeding catalyst slurry. A solvent feed can be introduced through sparge ring 29 having outlet ports 30 positioned for spraying upwardly into the mixing zone of the upper turbine impeller. The lower sparge ring is divided into two sections, 31 and 32. Solvent can likewise be introduced through ring section 31 as well as sparge 29, both being fed by conduit 33 connected to inlet 34. Monomer feed can be introduced through section 32 of the lower sparge which is fed by conduit 35. Reactor effluent is withdrawn through outlet 36.

Figure 2 is a horizontal sectional view of the reactor shown in Figure 1 taken along lines 2—2. In this view the relative location of the baffle plates 11, 11a, 11b and 11c can be clearly seen. While four baffle plates situated as shown are preferred, it should be understood that more or fewer plates can be used; however, they should be equally spaced from one another for maximum effectiveness. The concentric placement of the coil banks is also well shown in Figure 2. Likewise, the lower sparge ring is better illustrated in its two sections 31 and 32, with feed conduits 33 and 35 to each section, conduit 35 being connected to inlet 37.

The reactor of this invention can be employed equally well as a liquid-full reactor or as a gas-cap reactor, and the modification for the gas-cap reactor which enables circulation of the reactive gases through the liquid phase is shown in the various figures. Referring again to Figure 1, the zone normally occupied by the gaseous phase is designated by numeral 38. Ports 39 in shaft 7 communicate between the interior of the shaft and the gaseous phase. The action by which the gases are drawn from the gaseous phase and discharged through the liquid is illustrated in Figure 3, which shows the circulation pattern created by the turbine impeller elements. Gases entering through ports 39 travel downwardly through the interior 40 of shaft 7 and are distributed outwardly into the liquid phase 42 through discharge ports 41 in shaft 7 and collar 9. The rapidly rotating blades of the turbine impeller by centrifugal action direct the liquid toward the outer wall of the vessel and thereby create a pressure differential which moves the gases downwardly through the shaft and into the liquid phase.

It should be understood that the drawings and the above description are illustrative only of one embodiment of the present invention and it is not intended that this invention be unduly limited thereby. Reasonable variations in the internal construction of the vessel can be permitted without departing from the scope of this invention. For example, there can be any number of agitator elements within the vessel and each element can be associated with a sparge ring or not, as desired; also, some or all of the sparge rings can be divided for the introduction of more than one fluid. Additional impeller elements are advantageous when the reactor is lengthened. In general, the number of impellers mounted on a shaft should be about $L/D$, where L equals the reactor length, and D equals the reactor inside diameter. While this reactor is designed primarily for reactions requiring closed vessels, it can also be effectively employed as an open reactor.

The shape of the vessel, while preferably cylindrical with ellipsoidal ends, can have other reasonable configurations. Also, the conduits transferring temperature regulating fluids to the coils within the vessel can enter the vessel at any point as is convenient and the jacket can be omitted if its cooling capacity is not required. Other permissible changes within the scope of this invention have been made apparent by the above description.

I claim:

1. A stirred reactor suitable for use in the liquid phase catalytic polymerization of 1-olefins to solid polymer comprising, in combination, a vertical, elongated, cylindrical, jacketed vessel having a length approximately twice its diameter, a rotatable shaft axially disposed within said vessel, first and second turbine impeller elements mounted on said shaft in the upper and lower halves of said vessel respectively, two banks of helical heat exchange coils disposed concentrically about said shaft near but spaced inwardly from the wall of said vessel, said coil banks extending substantially the full length of said vessel, four elongated, strip baffle plates extending substantially the full length of said vessel and positioned between said coil banks at 90° intervals, each baffle aligned along a radius of said vessel, said baffle plates likewise being spaced inwardly from the wall of said vessel thereby leaving a clear, unobstructed annular space adjacent the vessel wall, a plurality of fins extending radially from said baffle plates between the individual heat exchange coils of at least one of said coil banks, two sparger rings, one ring positioned below each of said impeller elements for introducing material upwardly into the zone of maximum agitation provided by said impeller elements, and a conduit extending downwardly through said reactor and terminating in an opening immediately above said second impeller element and adjacent said shaft so as to discharge into the vortex of said second impeller element.

2. A reactor according to claim 1 for use in polymerization processes having a gas phase above the normal liquid level of the reaction mixture wherein said shaft is hollow and contains a plurality of ports at its upper extremity communicating between the space above said normal liquid level and the interior of said shaft and a plurality of ports immediately above one of said impeller elements communicating between the interior of said shaft and the space below said normal liquid level whereby gases can be drawn into said shaft from the gas phase and discharged into the liquid.

3. A stirred reactor suitble for use in the liquid phase catalytic polymerization of 1-olefins to solid polymer comprising, in combination, a vertical, elongated, cylindrical, jacketed vessel, a rotatable shaft axially disposed within said vessel, first and second turbine impeller elements mounted on said shaft in the upper and lower halves of said vessel respectively, two banks of helical heat exchange coils disposed concentrically about said shaft near but spaced inwardly from the wall of said vessel, said coil banks extending substantially the full length of said vessel, four elongated, strip baffle plates extending substantially the full length of said vessel and positioned between said coil banks at 90° intervals, each baffle aligned along a radius of said vessel, said baffle plates likewise being spaced inwardly from the wall of said vessel thereby leaving a clear, unobstructed annular space adjacent the vessel wall, a plurality of fins extending radially from said baffle plates between the individual heat exchange coils of at least one of said coil banks, two sparger rings, one ring positioned below each of said impeller elements for introducing material into the zone of maximum agitation provided by said impeller elements, and a conduit extending downwardly through said reactor and terminating in an opening immediately above said second impeller element and adjacent said shaft so as to discharge into the vortex of said second impeller element.

References Cited in the file of this patent

UNITED STATES PATENTS

| | | |
|---|---|---|
| 1,156,606 | Lawrie | Oct. 12, 1915 |
| 1,181,205 | Arnold | May 2, 1916 |
| 2,006,299 | Kaestner | June 25, 1935 |
| 2,145,679 | Beall et al. | Jan. 31, 1939 |
| 2,201,212 | Valentine | May 21, 1940 |
| 2,641,455 | Poirot | June 9, 1953 |
| 2,677,000 | Russum | Apr. 27, 1954 |